US006536797B1

(12) United States Patent
Reich

(10) Patent No.: US 6,536,797 B1
(45) Date of Patent: Mar. 25, 2003

(54) METHOD AND APPARATUS FOR MEASURING SEAT OCCUPANT WEIGHT

(75) Inventor: Daniel Reich, Macomb, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 22 days.

(21) Appl. No.: 09/650,349

(22) Filed: Aug. 29, 2000

Related U.S. Application Data

(60) Provisional application No. 60/153,429, filed on Sep. 10, 1999.

(51) Int. Cl.[7] ............................................. B60R 21/32
(52) U.S. Cl. ...................................... 280/735; 180/273
(58) Field of Search ............................... 280/735, 734; 180/273, 268; 701/45

(56) References Cited

U.S. PATENT DOCUMENTS

| 5,454,591 | A | 10/1995 | Mazur |
| 5,474,327 | A | 12/1995 | Schousek |
| 5,612,876 | A | 3/1997 | Zeidler |
| 5,678,854 | A | 10/1997 | Meister |
| 5,732,375 | A | 3/1998 | Cashler |
| 5,821,633 | A | 10/1998 | Burke |
| 5,865,463 | A | 2/1999 | Gagnon et al. |
| 5,906,393 | A | 5/1999 | Mazur et al. |
| 5,996,421 | A | * 12/1999 | Husby ................... 73/862.451 |
| 6,161,439 | A | * 12/2000 | Stanley ....................... 280/735 |
| 6,260,879 | B1 | * 7/2001 | Stanley ....................... 280/735 |
| 6,264,236 | B1 | * 7/2001 | Aoki .......................... 280/735 |

FOREIGN PATENT DOCUMENTS

| WO | WO9851547 | 11/1998 |
| WO | WO9912012 | 3/1999 |

* cited by examiner

*Primary Examiner*—Brian L. Johnson
*Assistant Examiner*—Christopher Bottorff

(57) ABSTRACT

A system for correcting seat occupant weight measurement error induced by a seat belt is used to control deployment of vehicle airbags. When a child seat is secured to a vehicle seat with a seat belt, the belt is pulled to a very tight position, which applies a greater force to the seat, erroneously raising the measured occupant weight. The subject system detects the difference between a child seat with a large seat belt force and a small adult, and modifies airbag deployment accordingly. The system includes a sensor assembly mounted within the seat bottom that measures a total seat occupant weight. A control unit generates a compensation factor based on the sensor assembly weight measurements and the mounting locations of the seat belt. The compensation factor is used to correct the total seat occupant weight, providing a modified occupant weight. Airbag deployment is controlled based on the modified occupant weight.

14 Claims, 3 Drawing Sheets

METHOD AND APPARATUS FOR MEASURING SEAT OCCUPANT WEIGHT

RELATED APPLICATION

This application claims priority to provisional application No. 60/153,429 filed on Sep. 10, 1999.

BACKGROUND OF THE INVENTION

1. Field of the Invention

This invention relates to a method and apparatus for measuring seat occupant weight and eliminating error caused by over tightened seat belts to improve airbag deployment control. Specifically, a compensation factor is determined based on seat occupant weight to correct error caused by an over-tight seat belt used to secure a child seat to a vehicle seat.

2. Related Art

Most vehicles include airbags and seatbelt restraint systems that work together to protect the driver and passengers from experiencing serious injuries due to a high speed collision. It is important to control the deployment force of the airbags based on the size of the driver or the passenger. When an adult is seated on the vehicle seat, the airbag should be deployed in a normal manner. If there is an infant seat secured to the vehicle seat then the airbag should not be deployed or should be deployed at a significantly lower deployment force. One way to control the airbag deployment is to monitor the weight of the seat occupant.

There are several different sensing systems that measure the weight of a seat occupant. One type of system uses pressure sensitive foil mats mounted within the seat bottom foam. Another system uses sensors placed at a plurality of locations within the seat bottom. The combined output from the mats or the sensors is used to determine the weight of the seat occupant.

These current sensor systems can have difficulty determining whether an adult is belted to the seat or whether a child car seat is belted to the seat. When a child seat is secured to the seat with a seat belt, an excess force acts on the sensors mounted within the rear portion of the seat, which interferes with accurate sensing of the weight of an occupant. Overtightening of the seatbelt, which makes it pull down on the rear of the seat, causes this force. The increased force causes the system to incorrectly detect a large child or small adult in the seat as opposed to a small child, resulting in airbag deployment instead of airbag suppression. Thus, due to this effect, the current weight sensing systems have difficulty in discerning between an adult occupant and a child in a child seat.

Thus, it is desirable to have a system for determining whether conditions are proper for deploying an airbag by determining whether a child in a child seat or an adult is belted to the seat. The system should further provide accurate measurements, be easy to install, and should overcome the above referenced deficiencies with prior art systems.

SUMMARY OF THE INVENTION

The subject invention provides a method and apparatus to compensate for loads induced by seat belt tension acting on a child seat or other similar occupant securely belted to a vehicle seat. Using the total measured occupant weight and the distribution of that weight on the vehicle seat, a compensation factor is generated for the belt-induced load. The compensation factor provides a reliable method of differentiating between a child seat with a large belt force and a small adult, thus resulting in proper airbag deployment control.

The method for correcting seat occupant weight measurement error induced by a seat belt includes the following steps. The seat occupant weight is measured and an asymmetry load is determined. The asymmetry load is the load that is applied to a vehicle seat based on a tension force generated by securing the occupant to the seat with a seat belt. A compensation factor is generated if the asymmetry load is greater than a minimum threshold and then the seat occupant weight is modified by the compensation factor. Preferably, the compensation factor is only generated if the weight is less than a predetermined weight. An airbag control signal is used to modify airbag deployment based on the corrected occupant weight In a disclosed embodiment of this invention, the method differentiates between a child seat belted to the vehicle seat and a small adult. A seat occupant weight signal is generated representing the total measured weight of the child and child seat. An asymmetry load is determined based on the sensor and seat belt mounting locations. If the asymmetry load is above a predetermined minimum and if the occupant weight signal is less than a predetermined weight then the compensation factor is generated and the occupant weight signal is modified. The child seat is detected if the modified weight signal is less than a predetermined threshold and airbag deployment is suppressed if the child seat is detected.

The system for correcting seat occupant weight measurement error induced by a seat belt includes a vehicle seat having a seat back supported with respect to a seat bottom and a sensor assembly for measuring the weight of a seat occupant to generate a total measured seat occupant weight signal. A seat belt assembly secures the seat occupant to the vehicle seat and includes at least one seat belt mounting portion positioned adjacent to the vehicle seat for mounting the seat belt assembly to a vehicle structure. A control unit generates an asymmetry load based on the position of the seat belt mounting portion and the measured weight of the seat occupant and provides a compensation factor when the asymmetry loads exceeds a predetermined threshold. The compensation factor modifies the total measured seat occupant weight signal to correct weight measurement error induced by seat belt tension forces applied to the occupant. Preferably, the control unit detects a child seat when the modified signal is less than a predetermined limit and sends a control signal to an airbag controller to suppress airbag deployment.

Thus, the subject invention provides a simple, reliable, and accurate method and apparatus for differentiating between various types of seat occupants. These and other features of the present invention can be best understood from the following specification and drawings, the following of which is a brief description.

DETAILED DESCRIPTION OF AN EXEMPLARY EMBODIMENT

Figure 1:
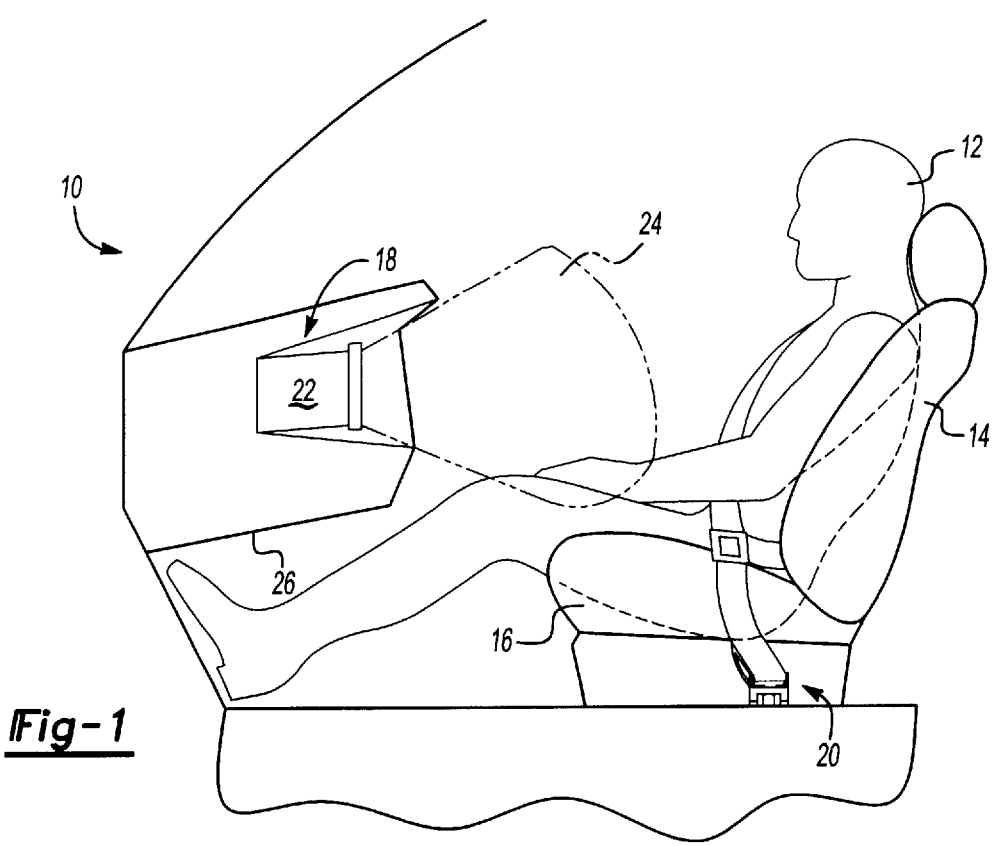
FIG. 1 is a schematic view showing a vehicle with a seat belt assembly and an airbag system with an occupant sitting in a seat showing the airbag in an active state in dashed lines.

A vehicle is shown generally at 10 in FIG. 1 with an adult occupant 12 seated in a seat having a seat back 14 supported with respect to a seat bottom 16. The vehicle 10 is equipped with an occupant restraint system that includes an airbag system 18 and a seatbelt system 20 that are used to restrain occupants 12 within the vehicle 10 under certain predetermined deceleration requirements. If the vehicle decelerates suddenly, such as when a collision occurs, occupants 12 will tend to continue to move forward due to inertial effects. An airbag controller 22 deploys an airbag 24 under predetermined collision circumstances to decelerate the occupants' impact speed before they contact a vehicle structure, such as a steering wheel or dashboard 26.

The airbag system 14 deploys an airbag 24 under certain collision conditions. The deployment force for the airbag 24, shown in dashed lines in FIG. 1, varies depending upon the type of occupant that is belted to the seat 12. When an adult 20 is belted to the vehicle seat 12, the airbag 24 should be deployed in a normal manner shown in FIG. 1.

Figure 2:
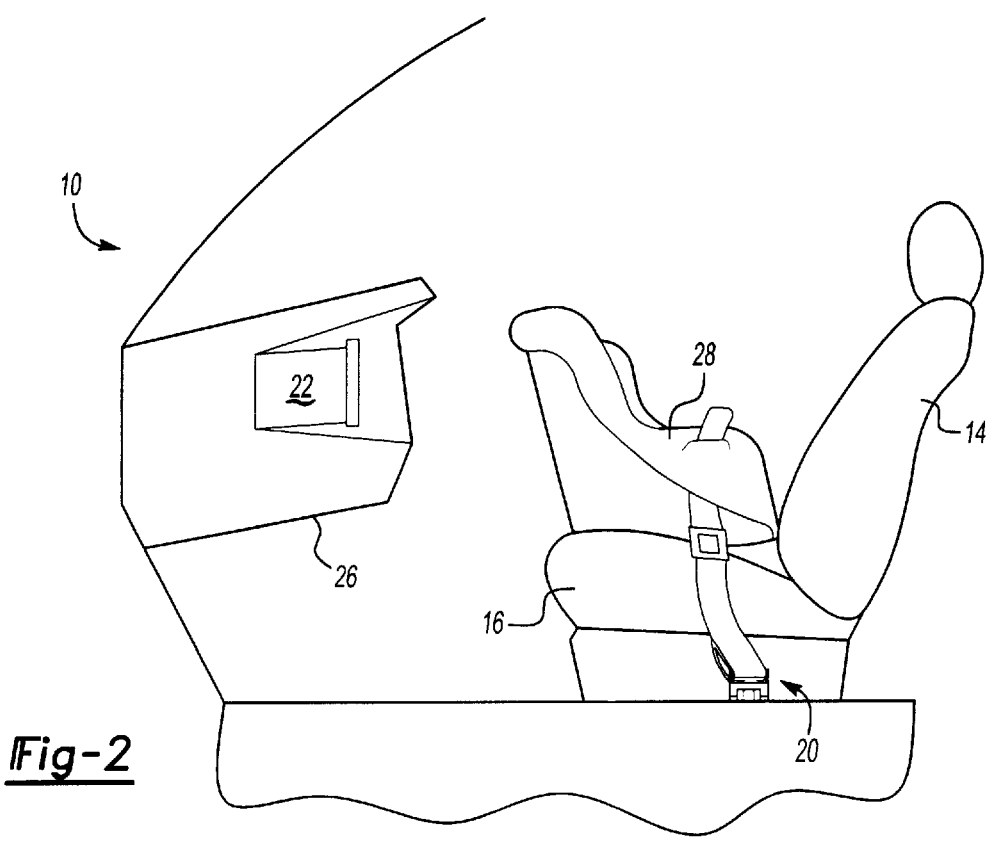
FIG. 2 is a side view of a seat assembly with an infant car seat secured to the vehicle seat with a seat belt.

If there is an infant or child seat 28 secured to the vehicle seat 12, see FIG. 2, then the airbag 24 should not be deployed. Thus, it is important to be able to determine whether there is an adult 20 belted to the seat 12 or whether a child seat 28 is belted to the seat 12. One way to determine this is by monitoring the weight exerted on the seat. When an adult 20 is belted to the seat, a weight is exerted against the seat bottom 16 and normal seatbelt forces are applied to the occupant 12 by the seatbelt 22. When an infant or child seat 28 is belted to the seat 12, a weight is exerted against the seat bottom 16 and high seat belt tension forces are applied to the child seat 28 by the seatbelt 22 because the seatbelt 22 is overtightened to securely hold the child seat 28 in place.

The subject invention provides a method to compensate for loads induced by seat belt tension acting on the child seat 28. By using a measured seat occupant weight and the distribution of that weight on the seat, a compensation factor for the belt-induced load can be determined. Thus, a reliable differentiation between a child seat 28 with a large seat belt force and a small adult can be made, resulting in proper airbag deployment control.

Preferably, airbag deployment is suppressed, i.e., turned off, for occupants (children and child seats) that weigh less than fifty-five (55) pounds. The airbag 24 is turned on for occupants that weigh more than one hundred and five (105) pounds. The airbag 124 can be deployed at full force or some lesser deployment force for occupants that are greater than fifty-five pounds. While fifty-five pounds is a preferred limit, other weight limits could also be used.

Depending upon the seat belt mounting configuration, large loads can be induced on the seat, confusing weight based occupant detection systems. The systems that do not account for seat belt induced loading would detect a large child or a small adult as opposed to a small child or child seat 28. The subject invention corrects for this error by determining the percentage of measured load induced by the occupant and the amount of the measured load induced by the seat belt 20.

Figure 3:
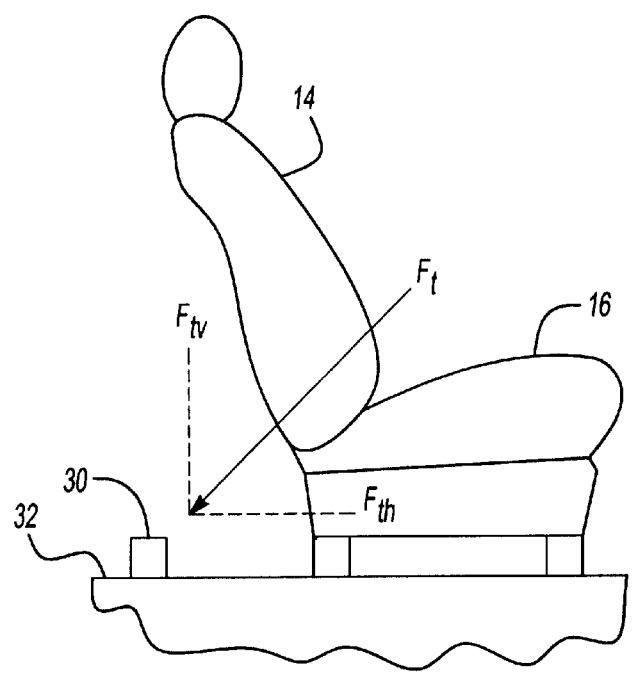
FIG. 3 is a side schematic view of seat belt forces applied to a seat assembly

Most seat belts attach to the vehicle at a minimum of one of three (3) mounting points. Attachments to the vehicle cause the additional loading to the seat in high belt tension circumstances. At least one seat belt mounting portion 30 is generally located aft and to on e side of the seat, see FIG. 3. The mounting portion 30 is used to secure the seat belt 20 to a vehicle structure such as the pillar, seat structure, or floor 32, for example. When the mounting portion 30 is in this location, the load Ft induced by the seat belt 20 not only has a vertical component Ftv, but also has a horizontal component Fth. The resulting force vector Ft causes an asymmetry in the seat loading that is detected by a seat weight measuring system.

Figure 4:
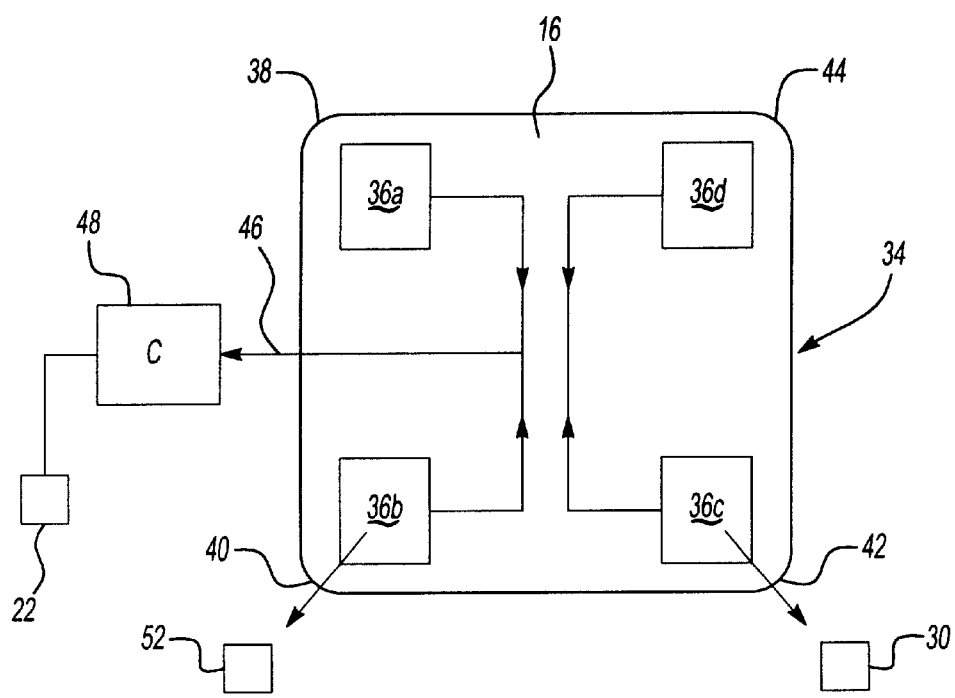
FIG. 4 is an alternate embodiment of the anchor of FIG. 3.

The seat weight measuring system preferably includes a sensor assembly 34 comprised of a plurality of load cells 36 that are mounted within the seat bottom 16. Preferably, as shown in FIG. 4, the sensor assembly 34 includes four (4) load cells 36. A first load cell 36a is positioned near a left front portion 38 of the seat, a second load cell 36b is positioned near a left rear portion 40 of the seat, a third load cell 36c is positioned near a right rear portion 42 of the seat, and a fourth load cell 36d is positioned near a right front portion 44 of the seat. While a configuration using four load cells 26 positioned in the four corners of a seat bottom 16 is preferred, it should be understood that any type of sensor assembly for measuring occupant weight could be used and could include any number of sensors positioned in various different mounting locations.

Each of the four load cells 36a, 36b, 36c, 36d generates a weight measurement for the left front (LF), left rear (LR), right rear (RR), and right front (RF) portions of the seat respectively. These measurements are combined to generate a total measured occupant weight signal 46, which is transmitted to a control unit 48, or other central computer or processing unit. The control unit 48 then generates a control signal 50 that is transmitted to the airbag controller 22 to control deployment of the airbag 24.

As shown in FIG. 4, the seat belt mounting portion 30 is mounted aft of the right rear (RR) portion 42 of the seat. An optional mounting portion 52 is shown aft of the left rear (LR) portion 40 of the seat and is shown in dashed lines. As discussed above, the seat belt force Ft is a resultant vector with horizontal Fth and vertical Ftv components. This vector force Ft causes an asymmetry in the seat loading, which is detected by the load cells 36. This asymmetry can be calculated from the four individual load measurements and used to calculate a compensation factor to correct for the additional belt load. The asymmetry direction is based on the load cell 36 and seat belt mounting locations 30. For a system with an inboard seat belt mount located above the load cell 36, i.e., the buckle connection on the seat, and the outboard mount 30 located on the vehicle floor 32 aft of the load cell 36, the asymmetry can be calculated by either of the following equations:

Percent Asymmetry=$(RR+RF-LF-LR)/(RR+RF+LF+LR)$ or

Percent Asymmetry=$(RR+RF+LR-LF)/(RR+RF+LF+LR)$

It should be understood that these equations are only examples of how to determine the asymmetry and that other equations using data compiled by the load cells 36 or other sensors, could also be used. Also, other similar equations may be used for other seat belt mounting locations.

Figure 5:
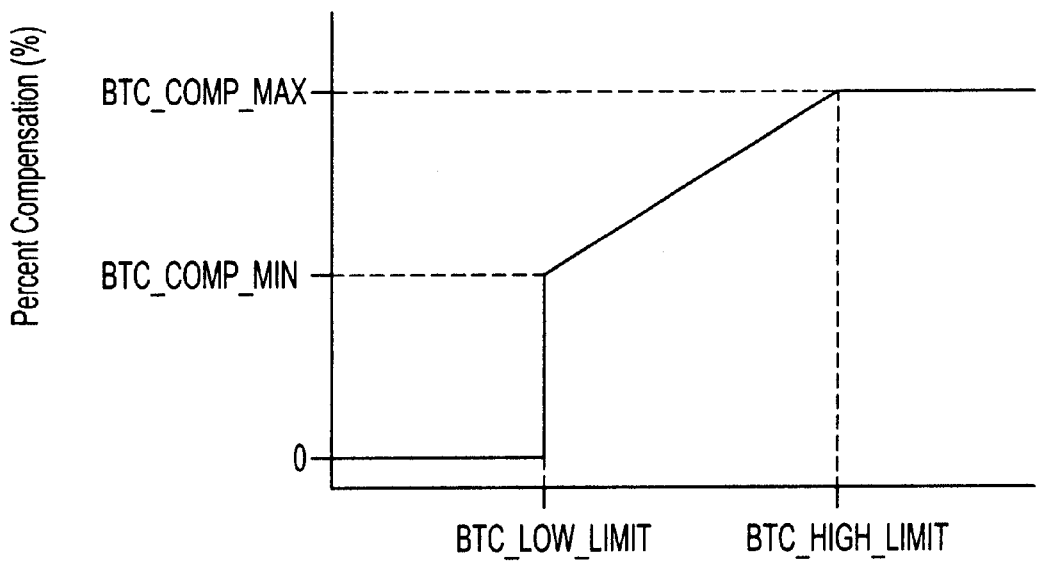
FIG. 5 is a graph of Compensation Percent vs. Asymmetry Percentage.

The asymmetry derived from these equations is processed by the control unit 48 to generate a compensation factor that is a percentage of the total weight measured for the seat occupant. A transfer function monitors the asymmetry. The compensation factor is not generated until the asymmetry reaches a minimum lower threshold, shown in FIG. 5. FIG. 5 depicts a graph of the Percent of Compensations vs. the Percent of Asymmetry. There is no compensation until the asymmetry reaches a belt tension compensation lower limit (BTC LOW LIMIT). Once this minimum threshold is achieved, the compensation factor is set to a belt tension compensation minimum (BTC COMP MIN) or initial value. As the asymmetry increases, the compensation factor increases until a maximum belt tension compensation value (BTC COW MAX) is reached. This maximum compensation factor corresponds to a maximum asymmetry limit at a belt tension compensation high limit (BTC HIGH LIMIT). The initial stop band shown on the graph for the compensation factor allows for extreme seating positions with large children and small adults. The maximum compensation factor is used to limit the compensation to a realistic value.

Typically, seat belt induced loads are not an issue for adults. The seat belt 20 will become very uncomfortable for the occupant before the additional load causes any error. Therefore, the compensation needs to be turned off for adult occupants and left on for children. The transition from compensation to no compensation is based on total measured weight. For occupants below a predetermined lower measured weight, the compensation correction is on, and for occupants above a predetermined upper measured weight, the compensation correction is off. A scaling zone between these two weight limits helps to smooth transition.

Figure 6:
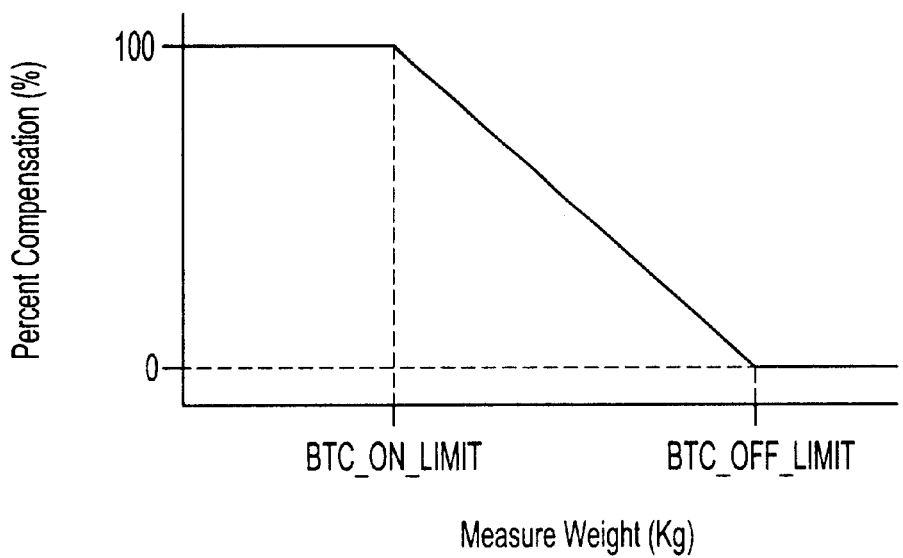
FIG. 6 is a graph of Compensation Percent vs. Measured Weight.

The graph shown in FIG. 6 shows the Percent Compensation vs. Measured Weight. At measured weights below a minimum belt tension compensation limit (BTC ON LIMIT), there is one hundred percent compensation. At measured weights above an upper belt tension compensation limit (BTC OFF LIMIT) there is zero percent compensation. At measured weights between these two limits, the compensation factor is scaled and decreases as the measured weight approaches the upper limit.

The scaled compensation factor is then multiplied by the total measure weight and the resulting weight is subtracted from the total measured weight to provide a modified weight. The modified weight is more accurate than the originally measured total weight because the compensation factor has been applied to eliminate loading induced by the seat belt 20. Thus, the difference between small adults and a child in a child seat 28 is easily distinguished.

The subject sensing system provides simplified and efficient apparatus and method for determining whether conditions are proper for deploying an airbag 24 by correcting seat occupant weight measurements by compensating for seat belt induced loading to detect whether a child seat 28 or an adult 12 is belted to the seat. The system provides reliable and accurate measurements.

Although a preferred embodiment of this invention has been disclosed, it should be understood that a worker of ordinary skill in the art would recognize many modifications come with in the scope of this invention. For that reason, the following claims should be studied to determine the true scope and content of this invention.

What is claimed is:

1. A method for correcting seat occupant weight measurement error induced by a seat belt comprising the steps of:
   (a) measuring an occupant load applied to a vehicle seat;
   (b) determining the value of an asymmetrical load applied to the vehicle seat resulting from forces generated by securing an occupant to the seat with a seat belt by using data obtained during step (a);
   (c) determining a compensation factor if the asymmetrical load value load is greater than a minimum threshold; and
   (d) modifying the measured occupant load value by the compensation factor to obtain a corrected seat occupant weight value.

2. A method according to claim 1 including the step of determining the compensation factor if the occupant load is less than a predetermined occupant weight value prior to step (c).

3. A method according to claim 1 including the step of generating an airbag control signal for modifying airbag deployment after step (d).

4. A method according to claim 1 including the step of determining the compensation factor as a percentage of total seat occupant weight during step (c).

5. A method according to claim 1 including the steps of providing the vehicle seat with a seat back supported with respect to a seat bottom, mounting a sensor assembly within the seat bottom with the sensor assembly including a right front sensor, a right rear sensor, al left rear sensor, and a left front sensor, and generating a total seat occupant weight signal based on measurements provided by each of the sensors during step (a).

6. A method according to claim 5 including the steps of positioning at least one seat belt mounting location adjacent to and aft of the vehicle seat, designating the right front sensor and the right rear sensors as right sensor, designating the left front sensor and the left rear sensor as left sensors, and determining the asymmetrical load value based on data from the sensor assembly that results from forces generated at said seat belt mounting location and is represented as a ratio of the difference between the values measured by the right and left sensors compared to the total values measured by the right and left sensors during step (b).

7. A method according to claim 1 including the step of providing a child seat secured to the vehicle seat with a seat belt prior to step (a), generating a seat occupant weight signal representing a total measured seat occupant weight during step (a), determining a compensation factor if the measured occupant weight value, predetermined amount during step (c), generating a modified weight value during step (d), detecting the child seat if the modified weight value is less than a predetermined threshold after step (d), and suppressing airbag deployment if the child seat is detected.

8. A method for correcting seat occupant weight measurement error induced by a seat belt comprising the steps of
   measuring total seat occupant weight;
   determining the value of an asymmetrical, load applied to a vehicle seat resulting from forces generated by securing an occupant to the seat with a seat belt;
   determining a compensation factor if the asymmetrical load is greater than a minimum threshold;
   determining the compensation factor as a percentage of total seat occupant weight;
   modifying the total seat occupant weight value by the compensation factor; and
   multiplying the total seat occupant weight value by the compensation factor to define a weight error value and subtracting the weight error value the total seat occupant weight value to define an adjusted occupant weight value.

9. A system for correcting seat occupant weight measurement error induced by a seat belt comprising:
   a vehicle seat having a seat back supported with respect to a seat bottom;
   a sensor assembly for measuring an occupant load applied by a seat occupant against said vehicle seat to generate a total measured seat occupant weight signal;
   a seat belt assembly for securing the seat occupant to said vehicle seat and including at least one seat belt mounting portion positioned adjacent to said vehicle seat for mounting said seat belt assembly to a vehicle structure;

a control unit for determining an asymmetrical load value based on data from said sensor assembly that results from forces generated at said seat belt mounting portion, wherein said control unit generates a compensation factor when said asymmetrical load value exceeds a predetermined threshold to modify the value of said total measured seat occupant weight signal by correcting weight measurement error induced by seat belt tension forces applied to the occupant.

10. A system according to claim 9 including an airbag controller for controlling u deployment of an airbag wherein said control unit generates a modified weight signal based on said compensation factor and transmits said modified weight signal to said airbag controller to modify deployment of said airbag when the value of said modified weight signal is less than a predetermined limit.

11. A system according to claim 10 wherein said control unit generates said compensation factor when the value of said total measured seat occupant weight signal is less than a predetermined weight.

12. A system according to claim 11 wherein said sensor assembly includes a plurality of weight sensors mounted within said seat bottom.

13. A system according to claim 12 wherein said plurality of weight sensors includes at least four sensors with a first sensor mounted adjacent to a right front comer of said seat bottom, a second sensor mounted adjacent to a right rear corner of said seat bottom, a third sensor mounted adjacent to a left rear comer of said seat bottom, and a fourth sensor mounted adjacent to a left front corner of said seat bottom.

14. A system according to claim 10 including a child seat secured to said vehicle seat it said seat belt assembly wherein said control unit detects said child seat when the value of said modified signal is less than a predetermined limit and sends a control signal to said airbag controller to suppress airbag deployment.

* * * * *